UNITED STATES PATENT OFFICE.

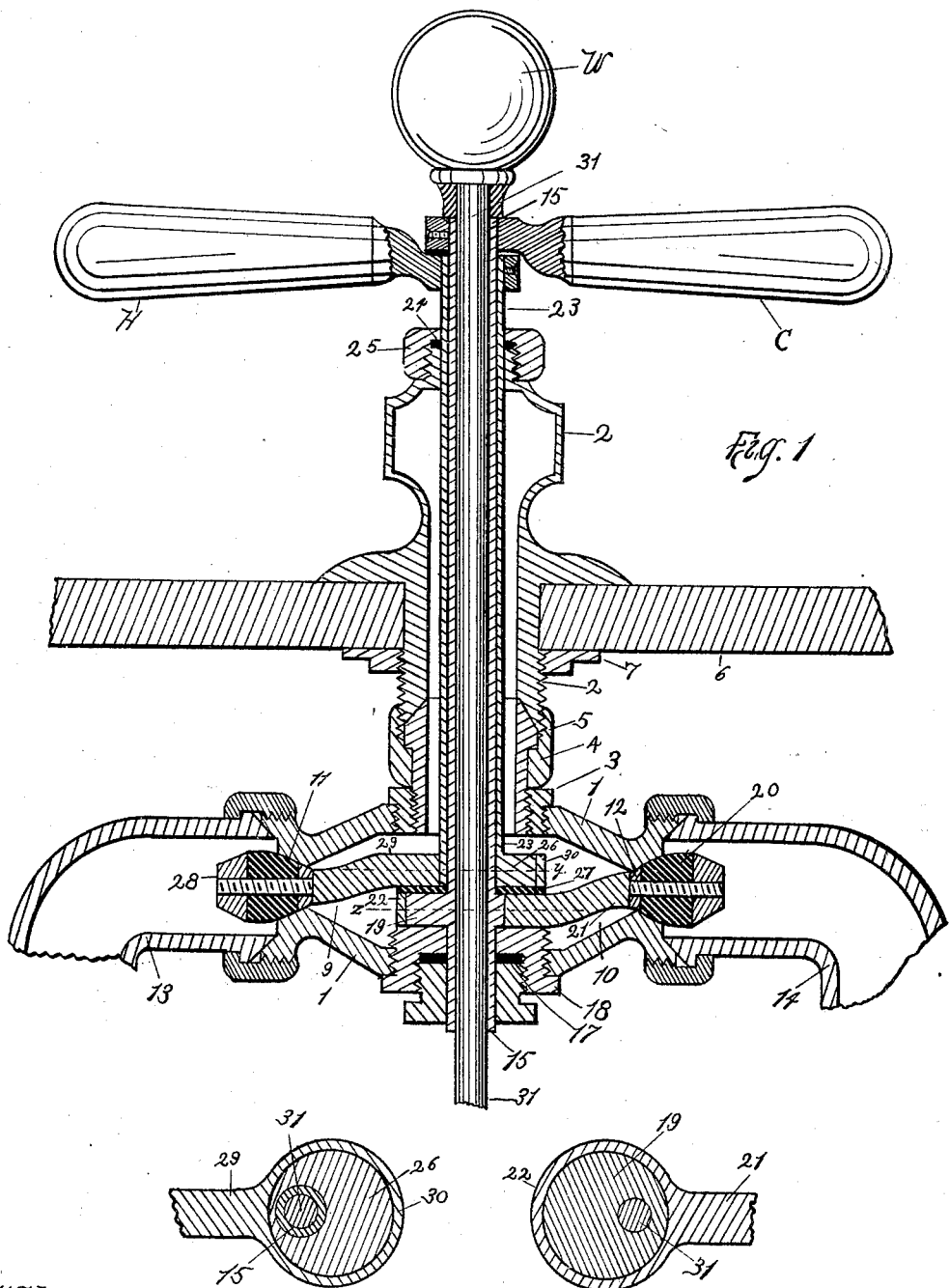

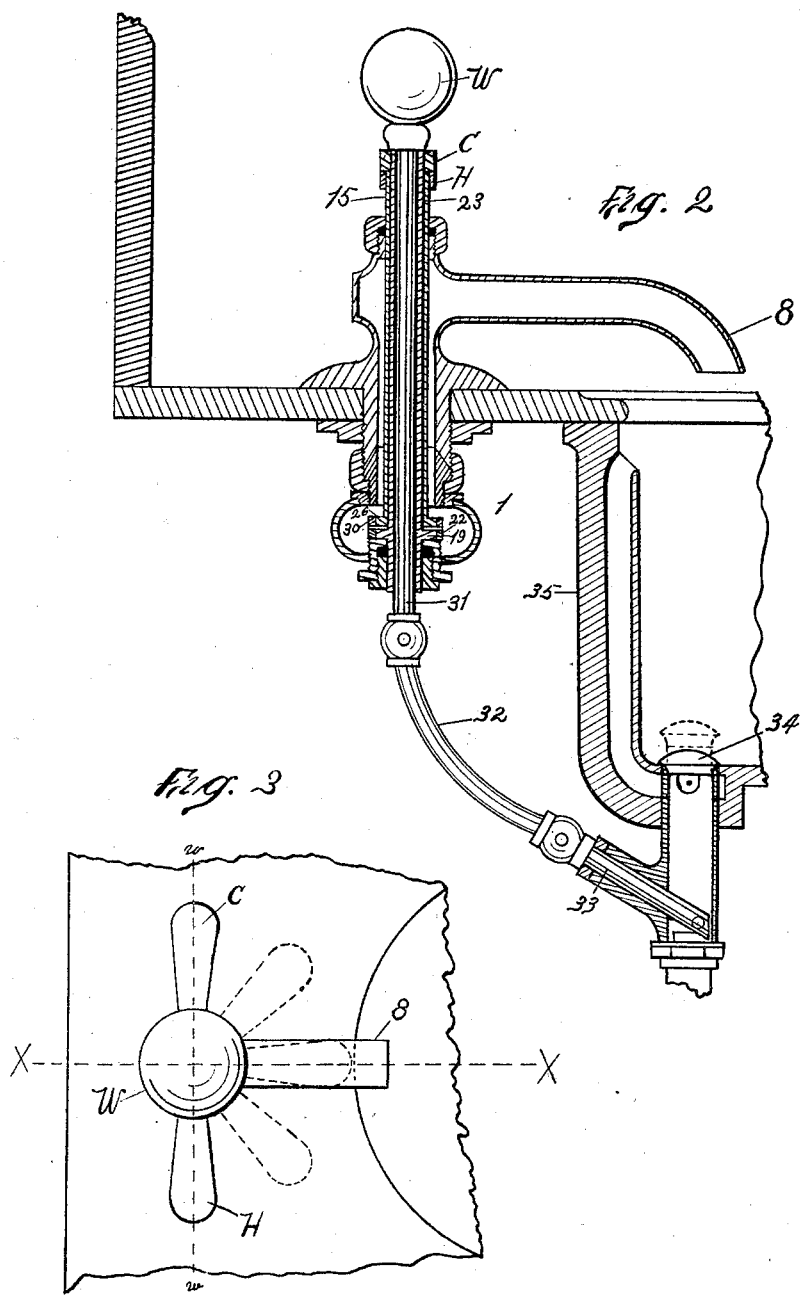

WILLIAM BUNTING, JR., OF BROOKLINE, MASSACHUSETTS.

COMBINATION SUPPLY AND WASTE APPARATUS.

SPECIFICATION forming part of Letters Patent No. 682,453, dated September 10, 1901.

Application filed February 27, 1901. Serial No. 49,038. (No model.)

*To all whom it may concern:*

Be it known that I, WILLIAM BUNTING, Jr., a citizen of the United States, and a resident of Brookline, in the county of Norfolk and State of Massachusetts, have invented certain new and useful Improvements in Combination Supply and Waste Apparatus, of which the following is a specification.

The object of my invention is to combine the means for operating the hot and cold water supply valve and the waste-valve of a basin or bath-tub into a single fixture which will occupy no more room than a single valve-fixture and which will necessitate but one hole through the basin-slab.

I carry out the above object by providing a suitably-packed tube which extends through the valve-chamber and is adapted to rotate therein and by providing said tube with suitable means for operating a valve and by passing through said tube a waste-valve-operating rod which is connected to a waste-valve at its lower end and is provided with means at its upper end for operating the same, so as to open and close the waste-valve. If both a hot and cold water valve is desired, I provide a second tube concentric with and outside of the first-named tube, with which I provide means for operating a second valve.

For a more complete understanding of my invention reference is made to the accompanying drawings, in which—

Figure 1 is a central cross-section on the line *w w* of Fig. 3. Fig. 2 is a section on a reduced scale, taken on the line X X of Fig. 3. Fig. 3 is a plan view of Fig. 2. Figs. 4 and 5 are detail views of the eccentrics, taken on the line *y* and *z*, respectively, of Fig. 1.

A valve-casing 1 is secured to the lower end of a discharge-pipe 2 by means of ring 3, spud 4, and union coupling-ring 5. Said discharge-pipe 2 passes through an aperture in the basin-slab 6, is clamped therein by nut 7 in the usual manner, and is provided with a discharge-nozzle 8. Valve-casing 1 is provided with two oppositely-arranged laterally-extending inlet-passages 9 and 10, and said passages are provided with valve-seats 11 and 12, respectively. Elbow-couplings 13 and 14 are connected to the inlet-passages 9 and 10, respectively, and the cold-water supply is connected to elbow 14 and the hot to elbow 13.

A valve-stem 15 extends downwardly through the top of discharge-pipe 2 and through a stuffing-box 17, which is formed in a screw-plug 18, the latter being secured in the bottom of valve-casing 1. Stem 15 has an eccentric 19 permanently secured thereto, so as to be practically integral therewith. A valve 20 is arranged in the connection 14 so that it will engage seat 12, and the stem 21 of said valve is provided with an eccentric-ring 22, which is in position on the eccentric 19. A second stem 23 is arranged outside of and concentric with the stem 15, the diameter of said stem 23 being such that it may rotate freely on the stem 15. A packing-washer 24 and ring 25 are provided at the upper end of pipe 2 and prevent any leakage past stem 23. An eccentric 26 is permanently or integrally secured to said stem 23 directly above the eccentric 19. A packing-washer 27 is interposed between the eccentrics 19 and 26, thus preventing the leakage of water between the two stems 15 and 23. A valve 28 is arranged to engage the valve-seat 11, and said valve is provided with a stem 29, having an eccentric-ring 30, which surrounds the eccentric 26.

The stem 23 is provided with a handle H at its upper end, and the stem 15 extends upwardly a short distance above the upper end of stem 23 and has a handle C secured thereto. Both handles are secured by set-screws or any other suitable means. The diameter of screw-plug 18 is made substantially the same as that of the eccentric-ring 22 and is extended upwardly, so that its upper end engages the under side of ring 22 and holds the same in place on its eccentric.

When I desire to combine the above-described construction with a waste-valve, I make the stem 15 hollow or tubular and pass a rod or shaft 31 therethrough. Said rod is provided with a lifting-knob W at its upper end and is jointed at its lower end to a link 32, which is in turn jointed to the end of a pull-rod 33, which operates the waste-valve 34 of a basin 35 in the manner disclosed in my prior patent, No. 654,600, dated July 31, 1900.

The operation of the above-described hot and cold water valve is as follows: The handles H and C will be in the full-line position shown in Figs. 1 and 3 when both valves 20 and 28 are closed, in which position the eccentric 19 will be thrown to its extreme left-hand position, or its center will be in line with the center of the stem 15 and center of valve 20 and eccentric 26 will be in the diametrically opposite position from the eccentric 19. If cold water alone is desired, the handle C will be thrown around toward the handle H in either direction, if hot water alone the handle H will be likewise thrown toward the handle C, and if water of an intermediate temperature is desired the handles will be moved until they meet and then the two together moved until water of the temperature desired is discharged from the nozzle. The friction of the parts is such that the valves will remain in any position to which they may be moved by the handles. By passing the inner stem 15 entirely through the valve, making the same hollow, and providing suitable packings therefor, which permits the stem to rotate without permitting leakage, I not only provide a convenient guiding means for guiding the waste-valve-operating rod, but I am also enabled to combine three fixtures in one in such a manner that the basin-slab has a much more attractive appearance aside from the important mechanical advantage of dispensing with two of the holes which are usually drilled through the basin-slab.

It will be obvious that if the fixture is to be used where there is cold water only the outer stem 23 and its connected parts will be omitted and that if an ordinary waste-plug is used, so that the operating-rod 31 is not needed, the stem 15 will be made solid. Both hollow stems may be connected together, so as to operate both valves simultaneously, or both valves may be operated independently by the stem 15 alone, if certain means known in the art are employed. However, I consider the construction shown in the drawings preferable.

When the fitting above described is to be used for a bath-tub, the discharge-pipe will be connected to the side by the valve-casing instead of to the top, as shown, if it is desired to have the nozzle lead through the wall thereof.

The above-described arrangement of eccentrics permits the handles to be thrown in either direction from any position, and although it would be less convenient to throw the handles around in the opposite direction from that shown in Fig. 3, yet I consider it an important advantage to be able to do this for the following reason. It sometimes happens that a chip or other object becomes lodged on the valve-seat, so that when the valve is closed it will still leak. If the valve is of the class in which the valve is forced to its seat, the more the handle is turned it often happens that a person will break some of the parts in his efforts to close the valve tight. With my arrangement there is no danger of this occurrence, for if the handles are moved beyond a certain point their valves will simply be opened.

Having described my invention, what I claim as new, and desire to secure by Letters Patent of the United States, is as follows:

1. A hot and cold water valve comprising a casing having two inlet-ports which are arranged on opposite sides of the casing, and a discharge-port, a valve in each inlet-port, a seat for each valve, said valves being so arranged that they will engage their respective seats and close said inlet-ports when they are moved toward each other, two independently-rotatable valve-stems, one of which is tubular and incloses the other, said stems being arranged substantially at right angles to the paths of movement of said valves and the inner of said stems extending below the end of the outer, connections between the lower end of each of said stems and said valves respectively, whereby when either stem is rotated its respective valve will be operated independently of the other.

2. A hot and cold water valve comprising a casing having two inlet-ports and a discharge-port, a valve for each inlet-port, two valve-stems one of which is tubular and incloses the other, two eccentrics, one of which is secured to the inner stem below the lower end of the outer stem, and the other of which is secured to said outer stem at its lower end, an eccentric-ring on each eccentric and connections between each ring and its respective valve.

3. A bath or basin fitting comprising a casing, a valve therefor, a tubular stem which passes entirely through said casing, a suitable packing in said casing for preventing the escape of water around said stem at the point where it passes through the casing, means for causing said stem to operate said valve, a waste-valve, means for operating said waste-valve comprising a handle which is located at the upper end of said stem, and connections between said handle and waste-valve which are located within said stem.

4. A bath or basin fitting comprising a valve-casing, a valve therefor, a tubular valve-stem which passes entirely through said casing, means for preventing the escape of water past said stem as it passes through said casing, means for causing said stem to operate said valve when it is rotated, a waste-valve, a rod which passes through said tubular stem, connections between the lower end of said rod and waste-valve for operating the latter, and an operating-handle at the upper end of said rod.

5. A bath and basin fitting comprising a valve-casing having a valve, a stem which is mounted in said casing, connections between said stem and valve for operating the latter, a passage throughout the entire length of said stem, two apertures in the walls of said casing which are in line with the passage through said stem, a waste-valve, a handle located at the upper end of said stem, and connections between said handle and waste-valve which pass through said stem and the apertures in said valve-casing, and which are adapted to operate said waste-valve.

6. A hot and cold water valve comprising a casing having two inlet-ports which are arranged on opposite sides of the casing, and a discharge-port, a valve in each inlet, a seat for each valve, said valves being so arranged that they will engage their respective seats and close said inlet-ports when they are moved toward each other, two independently-rotatable valve-stems, one of which is tubular and incloses the other, said stems being arranged substantially at right angles to the paths of movement of said valves, the inner of said stems extending both above and below the ends of the outer stem, connections between the lower ends of each stem, and one of said valves, respectively, and a laterally-extending handle on the upper end of each stem, respectively.

7. A hot and cold water valve comprising a valve-casing having two inlet-ports and a discharge-port, a valve for each inlet-port, two tubular valve-stems, one of which incloses the other, connections between each of said stems and one of said valves which are adapted to operate said valves when said stems are rotated, a waste-valve, an operating-rod which is connected to said valve and passes through said inner tubular stem, and handles on the upper ends of said valve-stems and rod.

8. A hot and cold water valve comprising a casing having two laterally-arranged inlet-ports and a discharge-port, two independently-rotatable valve-stems, one of which is tubular and incloses the other, a valve in each inlet-port, a seat for each valve, said valves being so arranged and guided that they move in planes which are substantially at right angles to said stems when they move toward and from their respective seats, said stems terminating near the planes of said valves and having the end of the inner stem extending below the end of the outer, connections between the lower end of each of said stems and said valves, respectively, whereby when either stem is rotated its respective valve will be operated independently of the other.

9. A hot and cold water valve comprising a casing having two laterally-arranged inlet-ports and a discharge-port, two independently-rotatable valve-stems, one of which is tubular and incloses the other, a valve in each inlet-port, a seat for each valve, said stems terminating adjacent said valves, the end of the inner stem extending below the end of the outer, an eccentric on the lower end of each stem, connections between each eccentric and its corresponding valve, whereby when either stem is rotated its respective valve will be operated independently of the other.

10. A hot and cold water valve comprising a casing having two laterally-arranged inlet-ports and a discharge-port, two independently-rotatable valve-stems, one of which is tubular and incloses the other, a valve in each inlet-port, a seat for each valve, said stems terminating adjacent said valves, the end of the inner stem extending below the end of the outer, connections between the lower end of each stem and its respective valve, whereby when either stem is rotated its corresponding valve will be operated independently of the other.

In testimony whereof I have affixed my signature in presence of two witnesses.

WILLIAM BUNTING, JR.

Witnesses:
 LOUIS H. HARRIMAN,
 G. EDWARD UCKER.